Apr. 24, 1923.

M. E. WIDELL ET AL 1,452,947

HORIZONTAL STATIONARY DOUBLE SEAMER FOR CANS

Filed Nov. 17, 1920

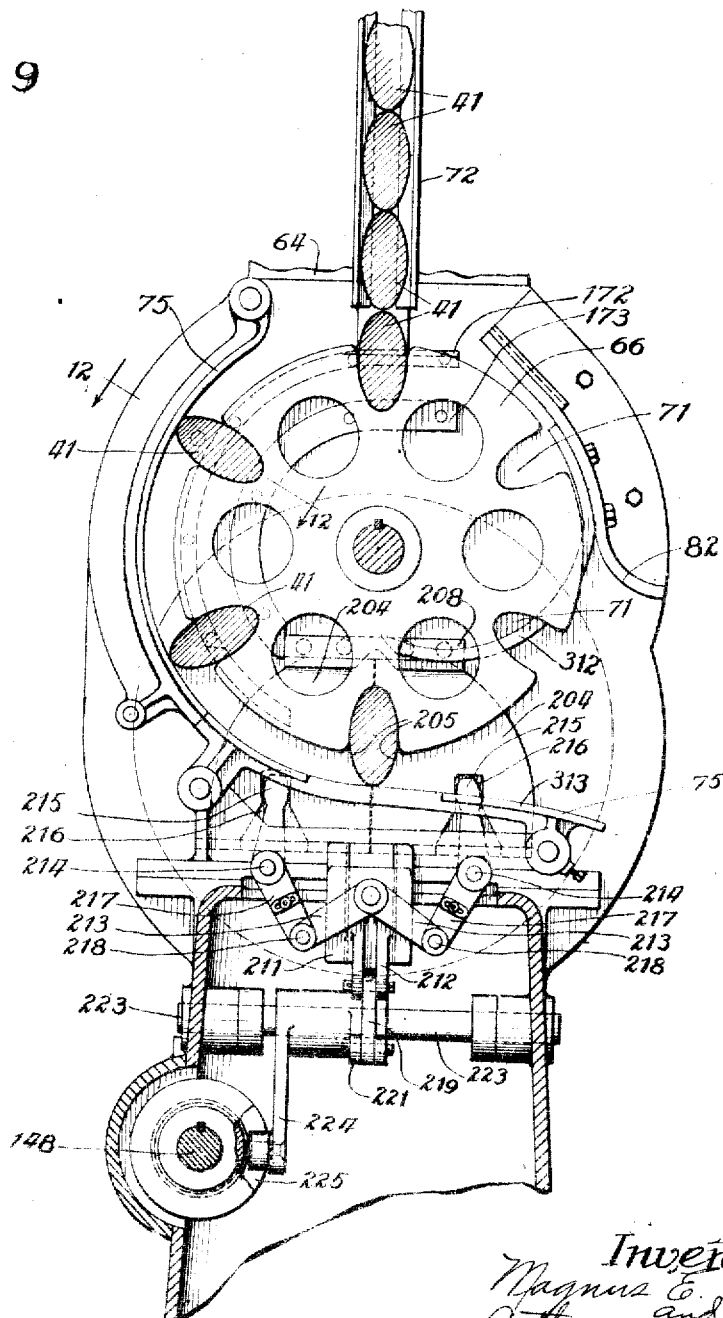

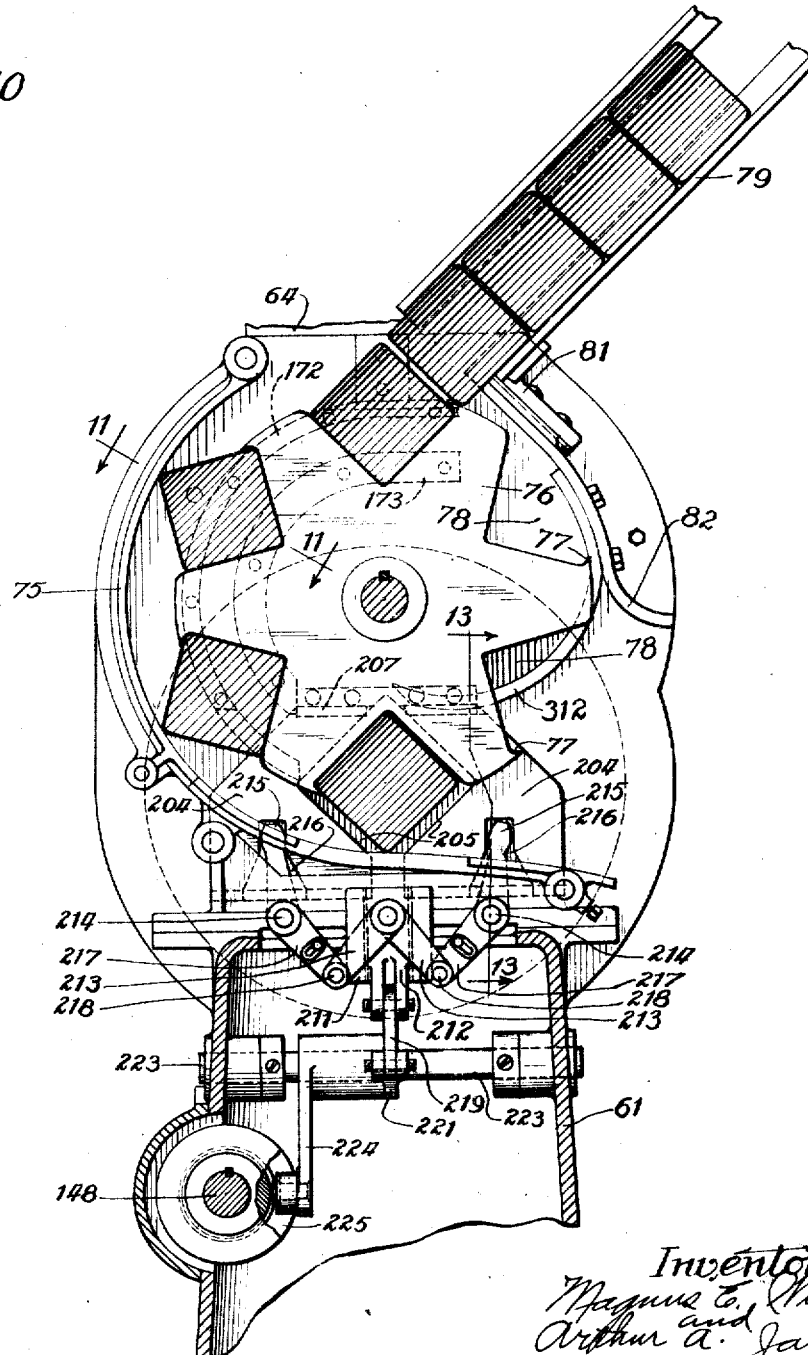

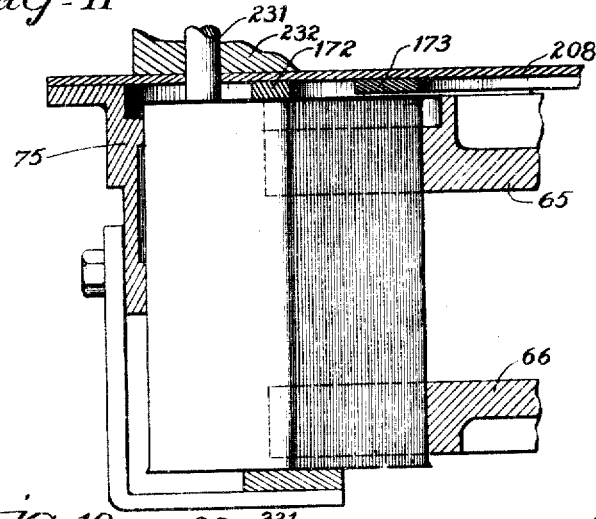
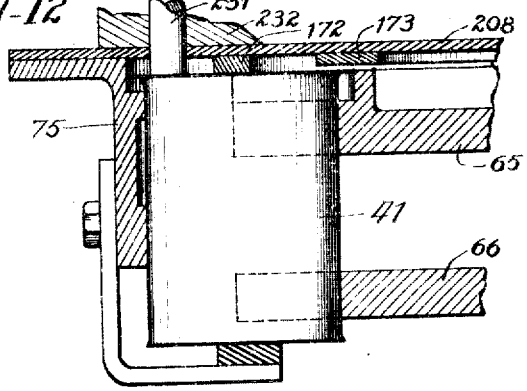
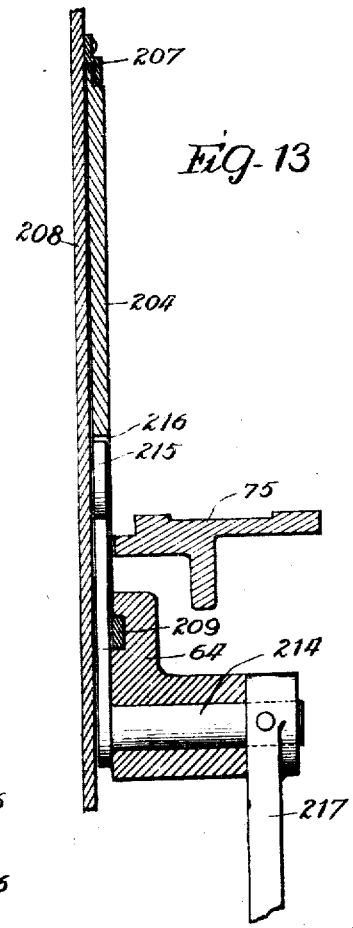
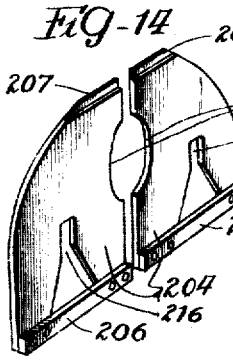
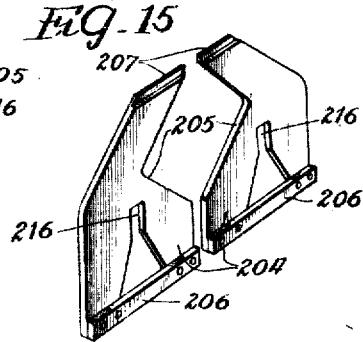

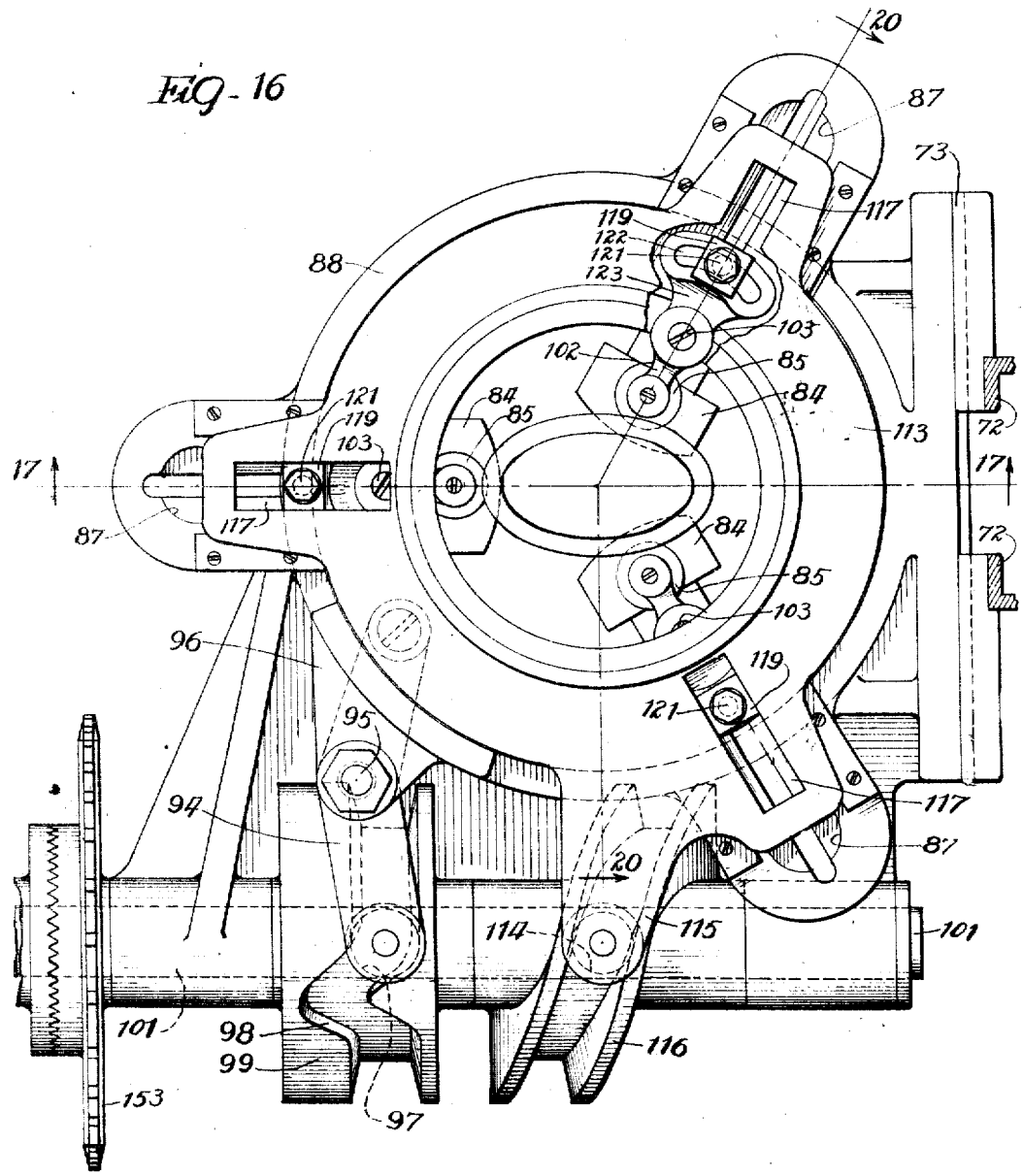

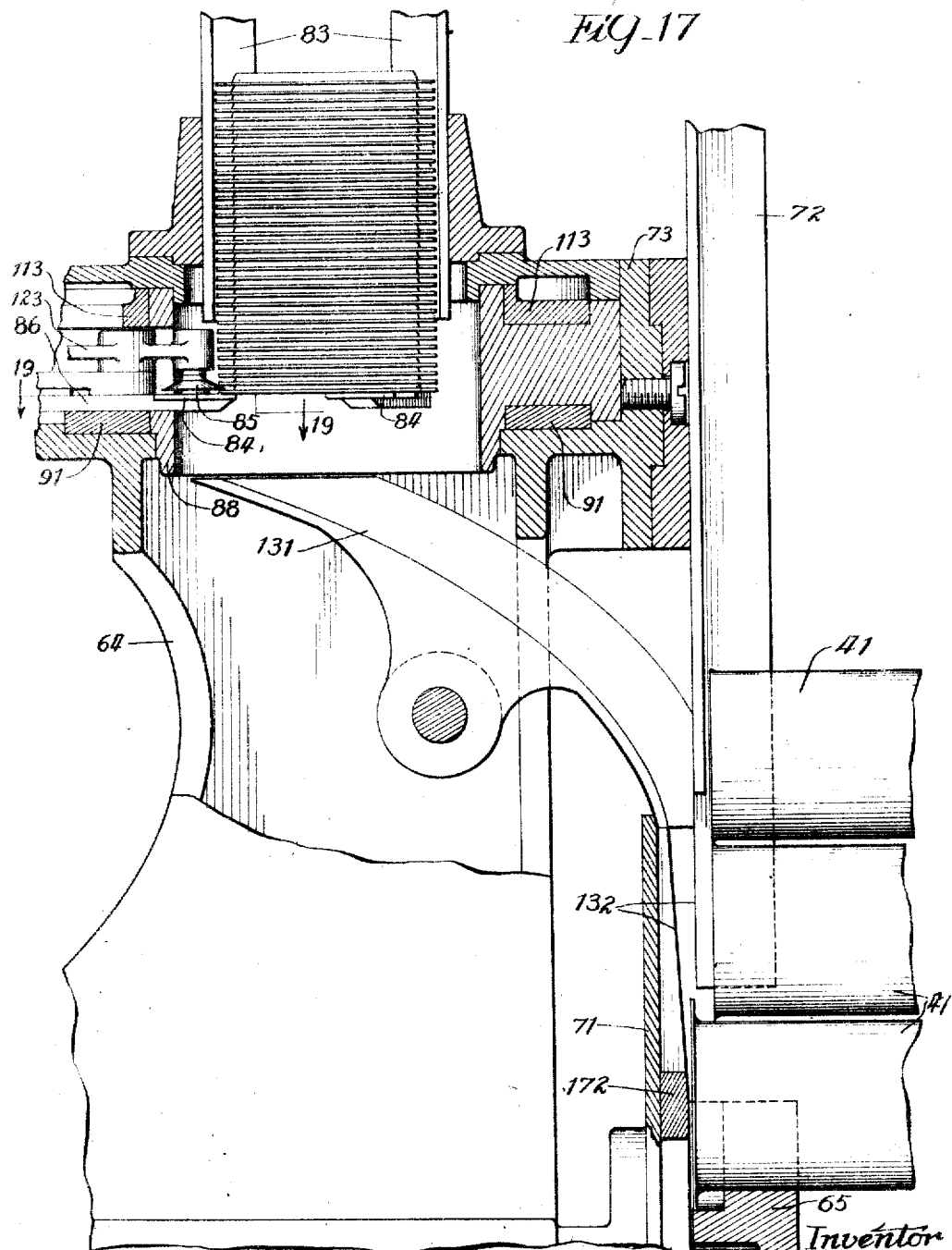

Apr. 24, 1923.

M. E. WIDELL ET AL 1,452,947

HORIZONTAL STATIONARY DOUBLE SEAMER FOR CANS

Filed Nov. 17, 1920  17 Sheets-Sheet 11

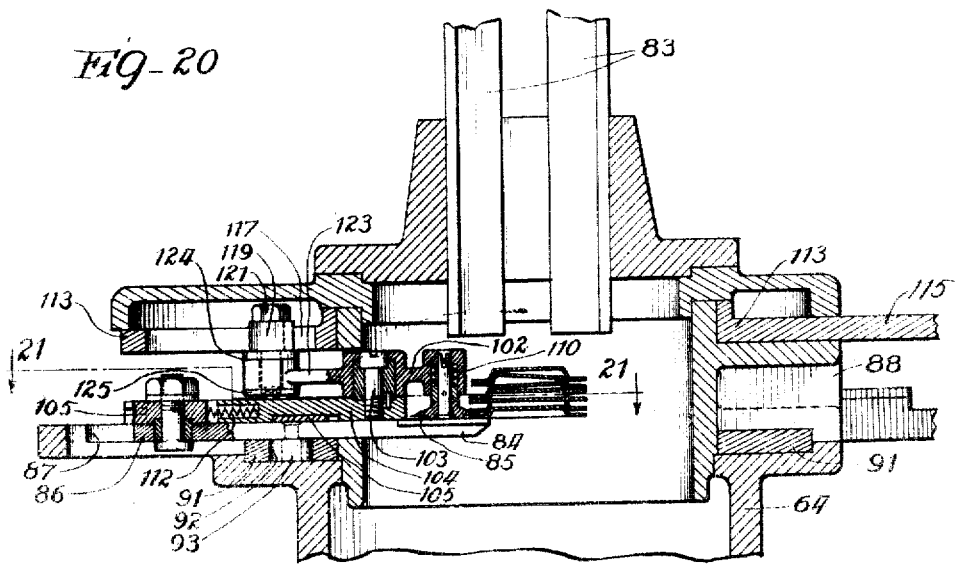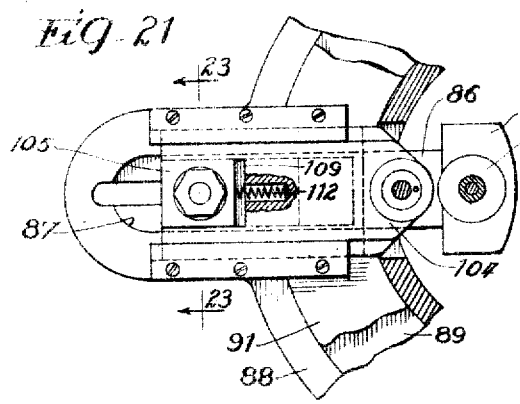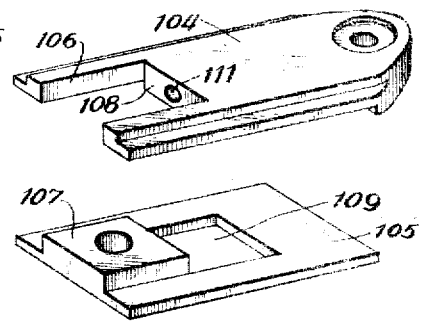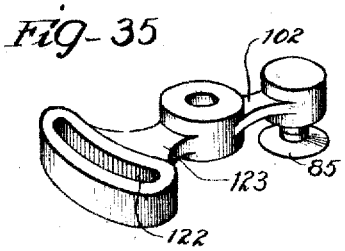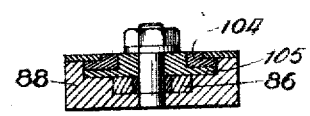

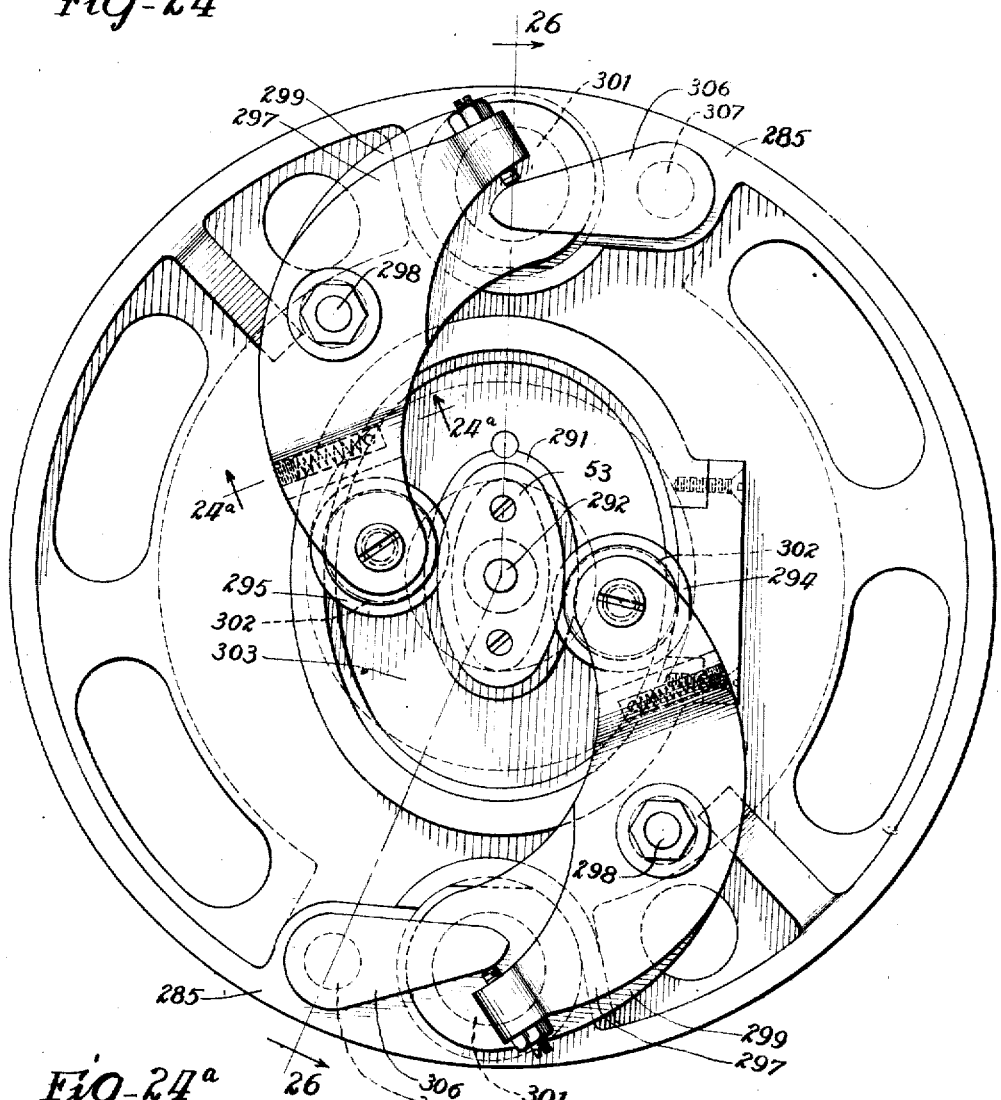
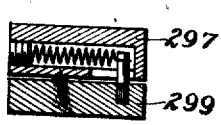

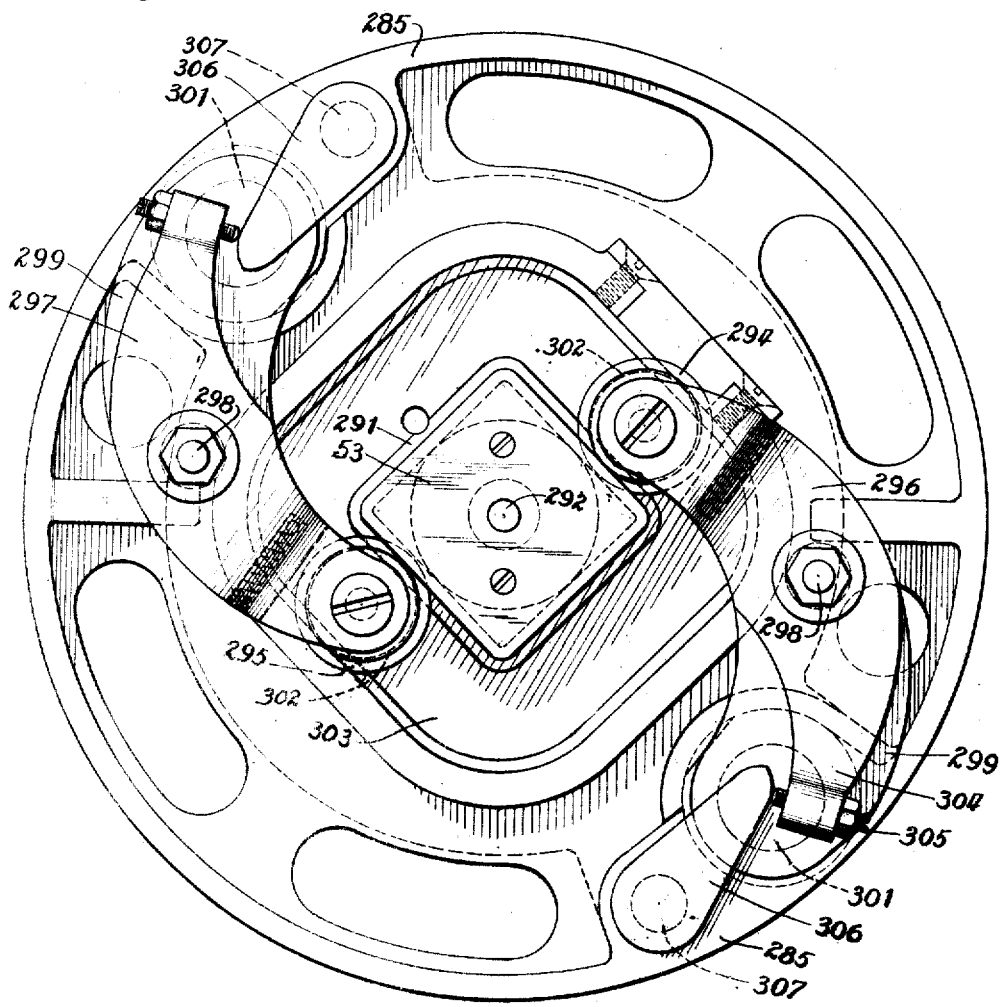

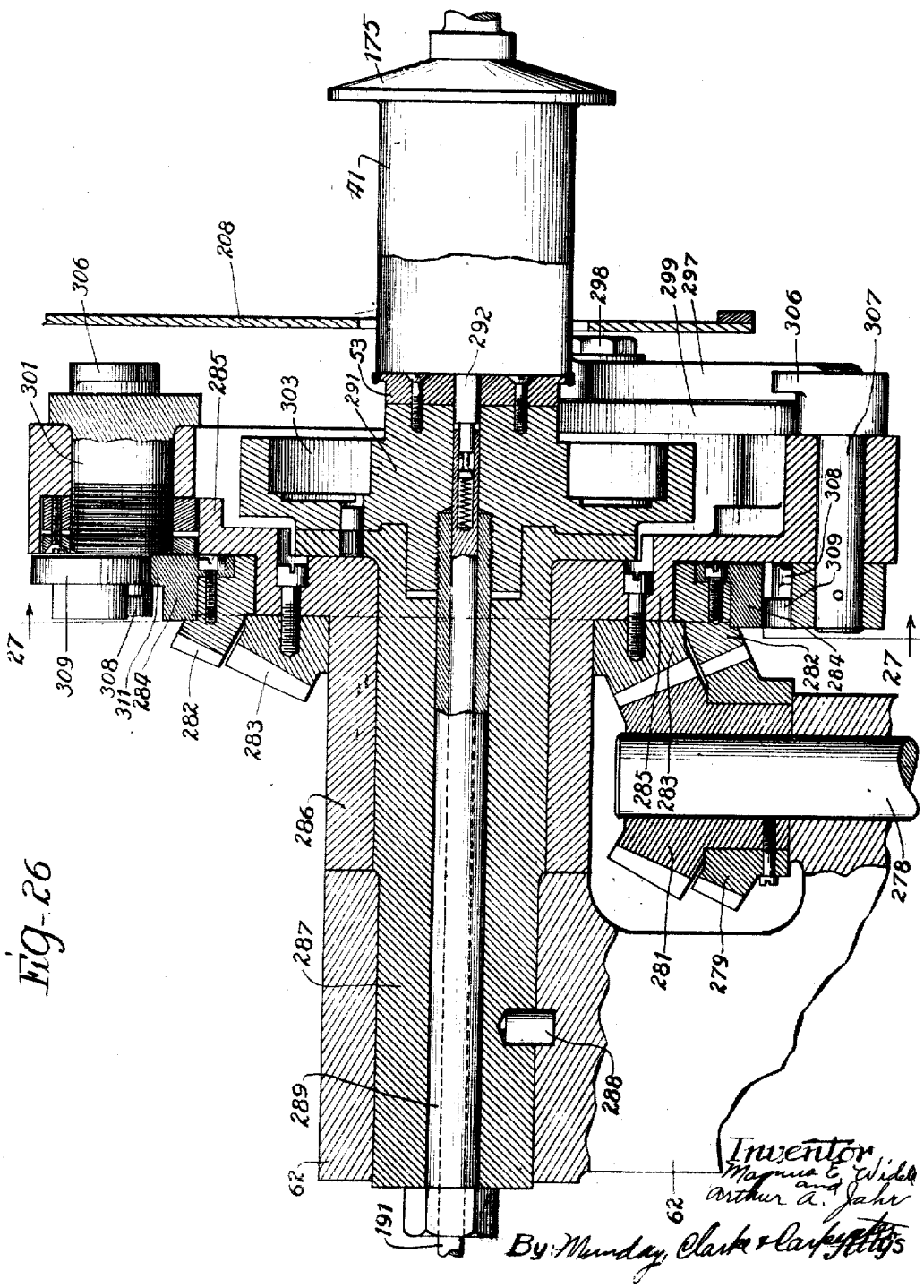

Apr. 24, 1923.

M. E. WIDELL ET AL 1,452,947

HORIZONTAL STATIONARY DOUBLE SEAMER FOR CANS

Filed Nov. 17, 1920   17 Sheets-Sheet 16

Inventor
Magnus E. Widell
Arthur A. Jahr
By Munday, Clarke & Carpenter
Attys

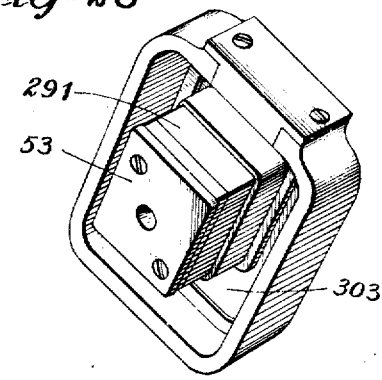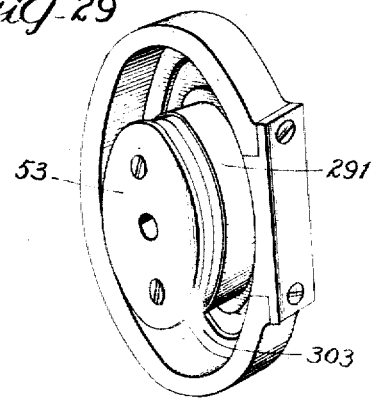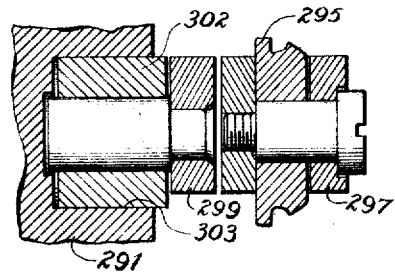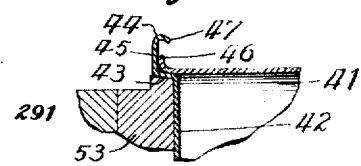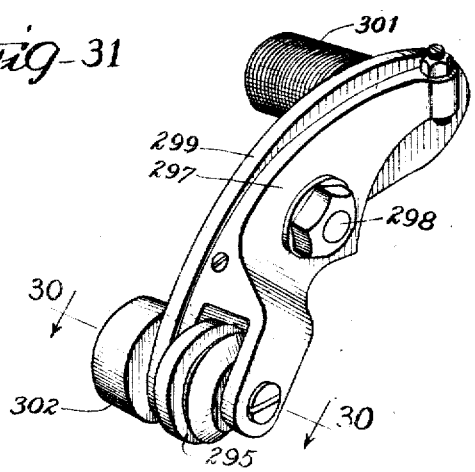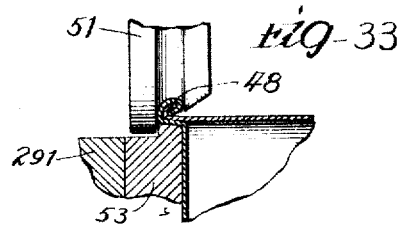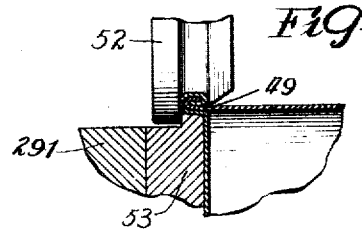

Patented Apr. 24, 1923.

1,452,947

UNITED STATES PATENT OFFICE.

MAGNUS E. WIDELL, OF MAYWOOD, AND ARTHUR A. JAHR, OF FOREST PARK, ILLINOIS, ASSIGNORS TO AMERICAN CAN COMPANY, OF NEW YORK, N. Y., A CORPORATION OF NEW JERSEY.

HORIZONTAL STATIONARY DOUBLE SEAMER FOR CANS

Application filed November 17, 1920. Serial No. 424,697.

*To all whom it may concern:*

Be it known that we, MAGNUS E. WIDELL and ARTHUR A. JAHR, citizens of the United States, residing in Maywood and Forest Park, respectively, in the county of Cook and State of Illinois, have invented a new and useful Improvement in Horizontal Stationary Double Seamers for Cans, of which the following is a specification.

This invention relates in general to double seaming machines and, while from certain aspects has more particular reference to machines for double seaming the ends of cans of non-circular shape, it will be manifest, as the invention is better understood, that from other aspects it has valuable uses in connection with the seaming of ends to circular cans.

A principal object of our present invention is the provision of a wholly automatic, highly efficient double seaming machine for irregular or non-circular bodies and of new and improved construction.

Another important object of the invention is the provision of a machine of this kind, which, by the changing of a small number of parts, may be adapted for the seaming of cans of other shapes.

Another object of the invention is the provision of a machine of this character of relatively simple construction having few or no delicate parts likely to require frequent repair or replacement.

Another and highly important object is the provision of an apparatus of this character, which will insure stopping of the machine under unfavorable working conditions and which will insure the presence of a can end to be seamed to each can body.

Numerous other objects and advantages of the invention will be apparent as it is better understood from the following description, which, taken in connection with the accompanying drawings, discloses a preferred embodiment thereof.

Referring to the drawings.

Figure 1:
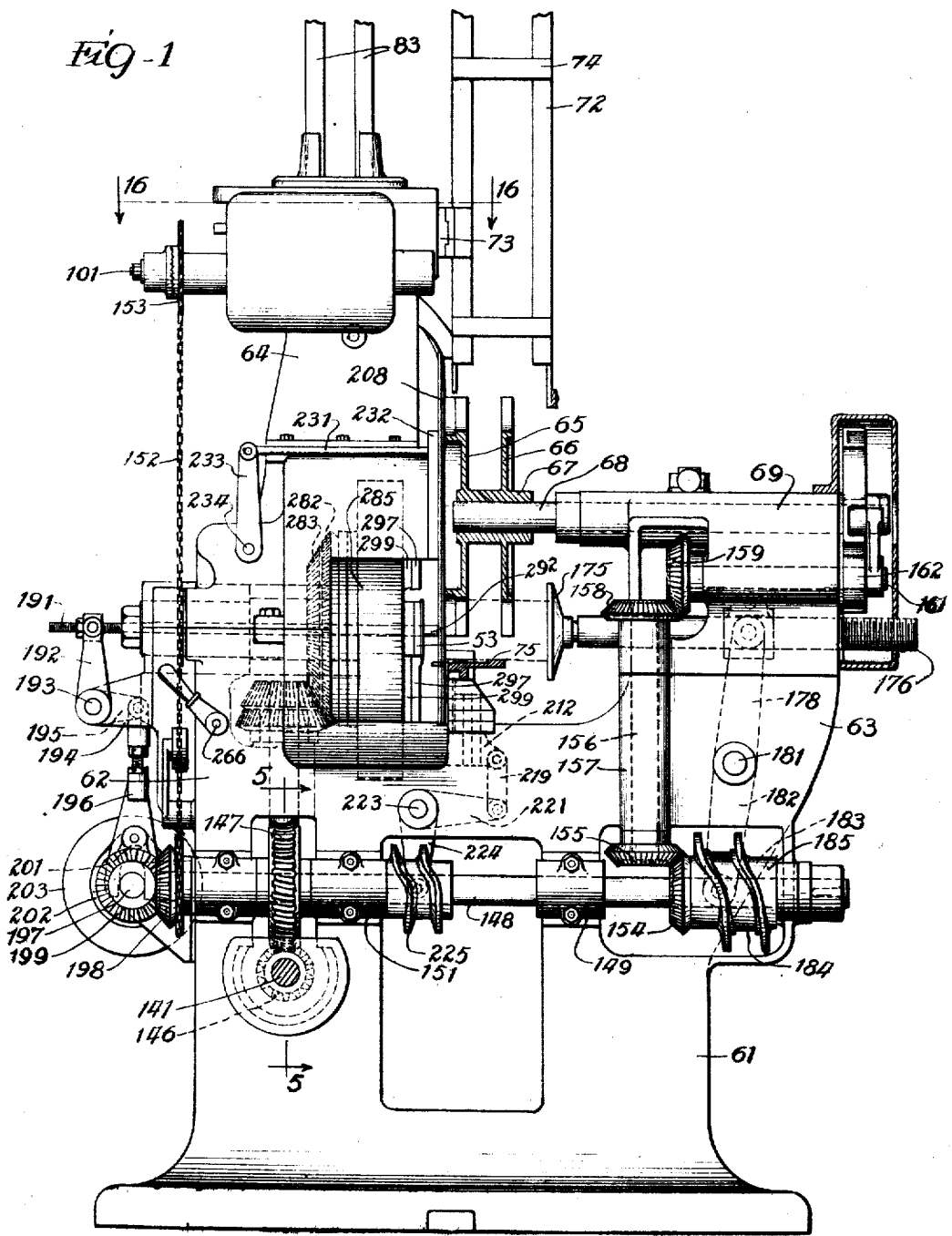
Figure 1 is a side elevation of an apparatus embodying our invention, certain parts being shown in section.
Figure 2:
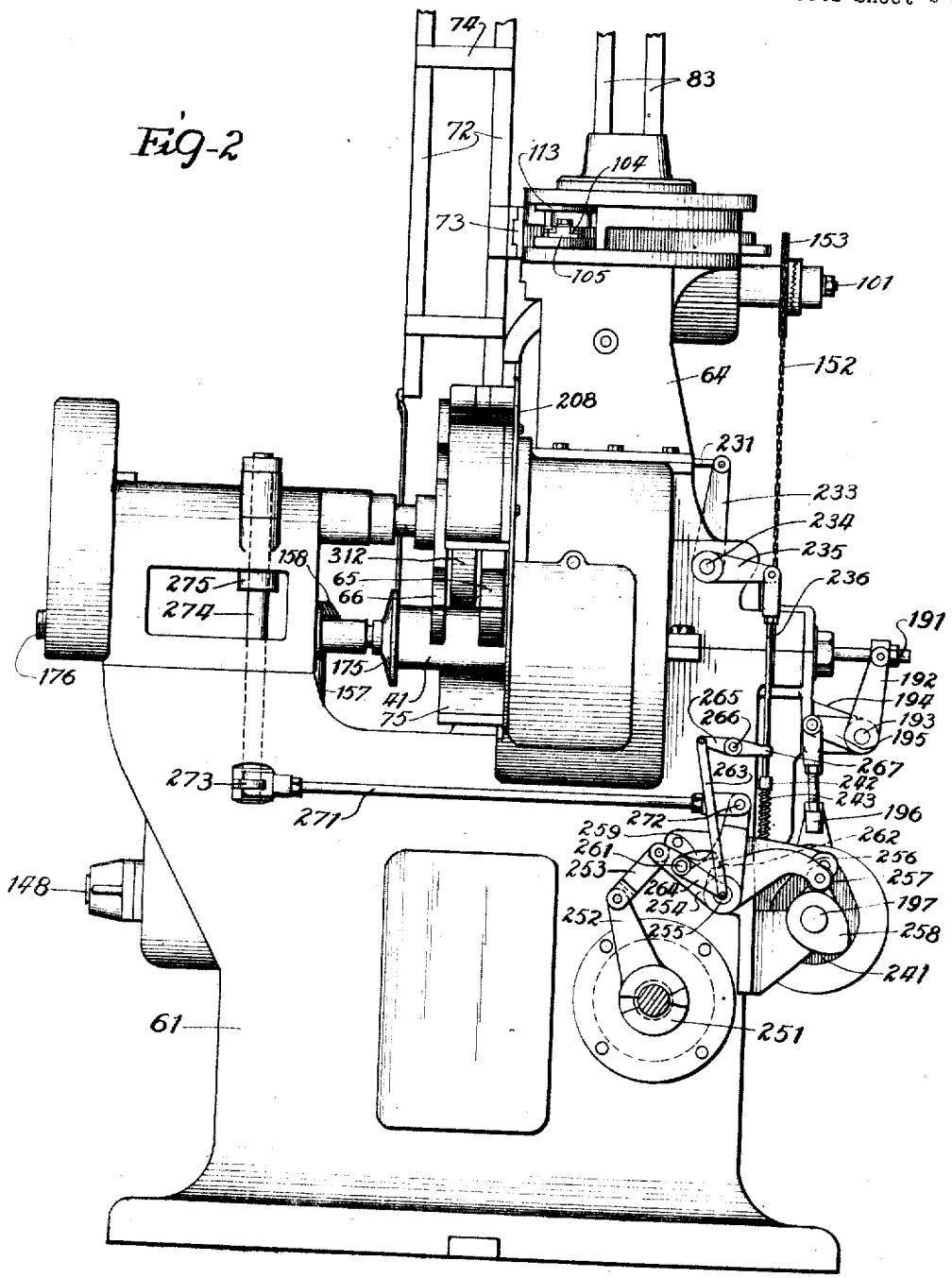
Fig. 2 is a rear view of the same.
Figure 3:
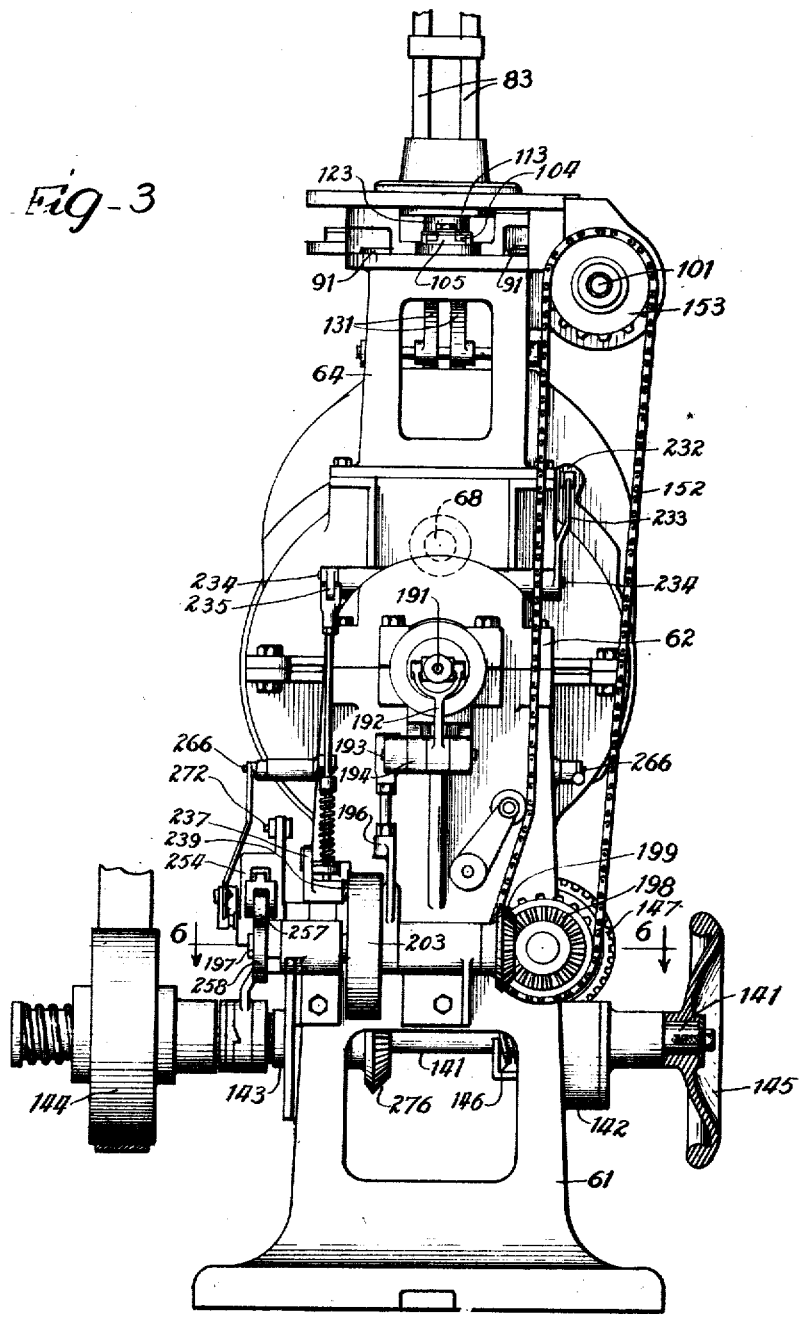
Figs. 3 and 4 are end views looking from the opposite sides.
Figure 4:
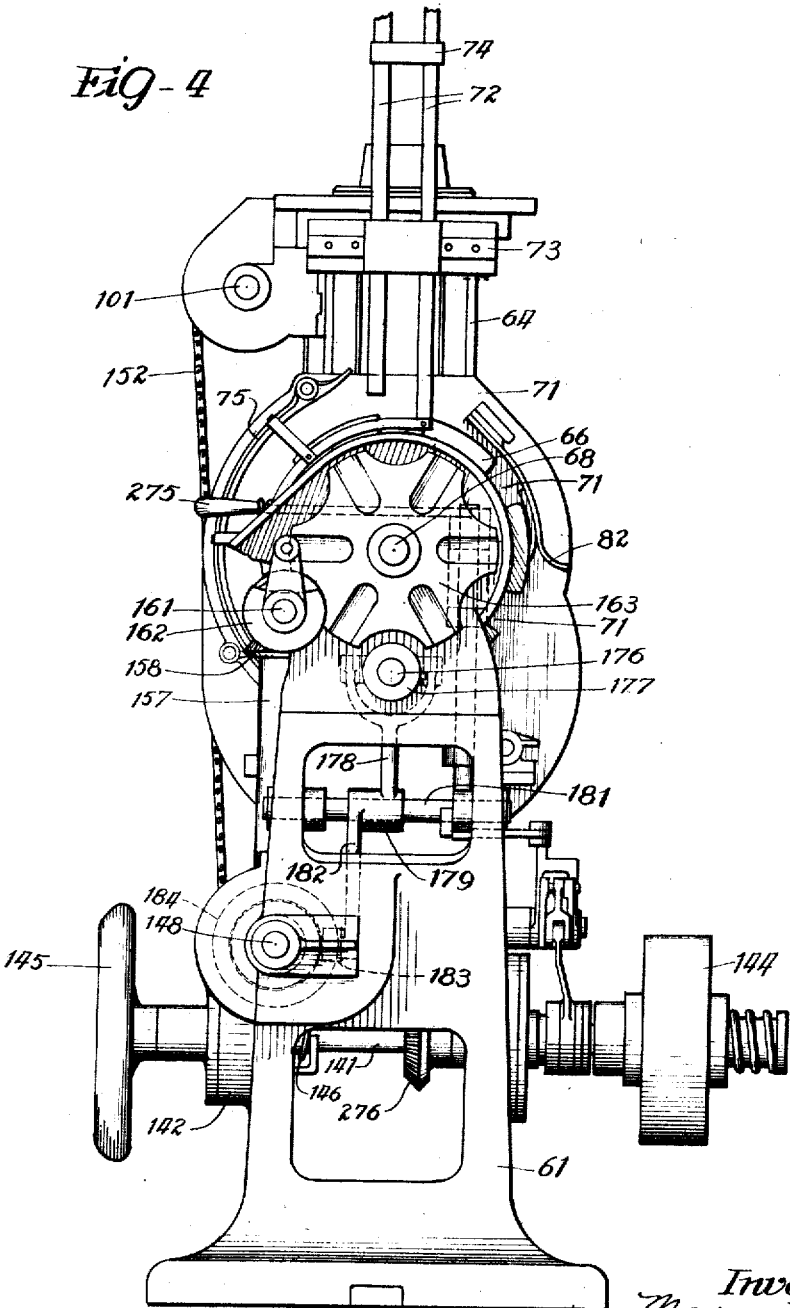
Figure 6:
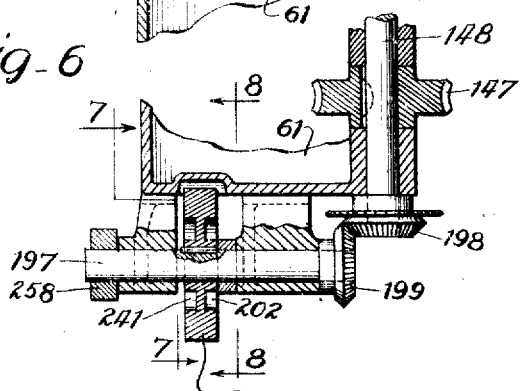
Fig. 6 is a section taken substantially on the line 6—6 of Fig. 3.
Figure 7:
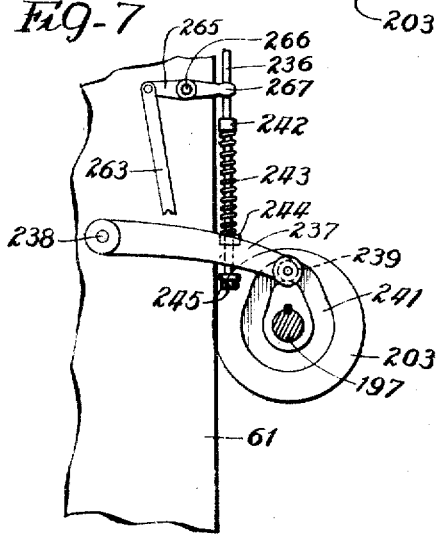
Figure 8:
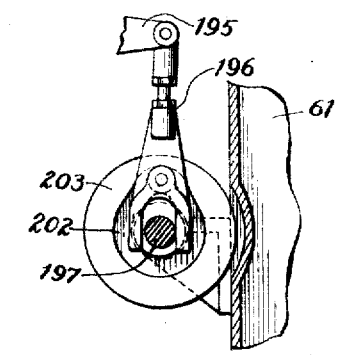
Figure 18:
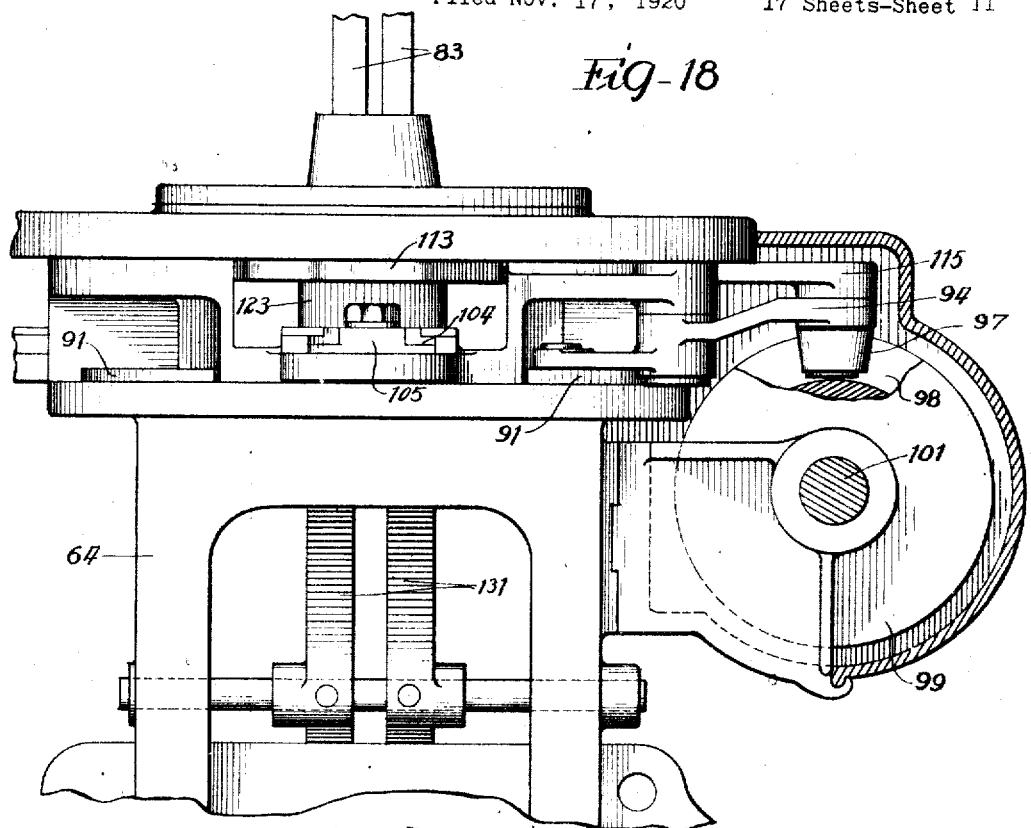
Figure 19:
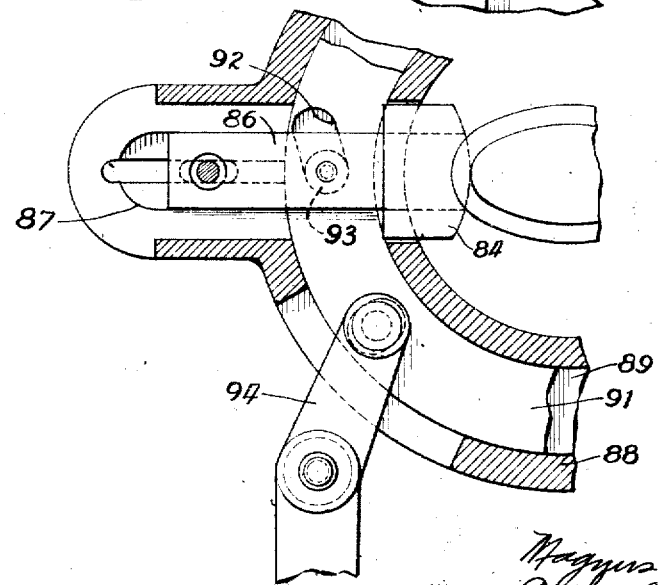
Figure 27:
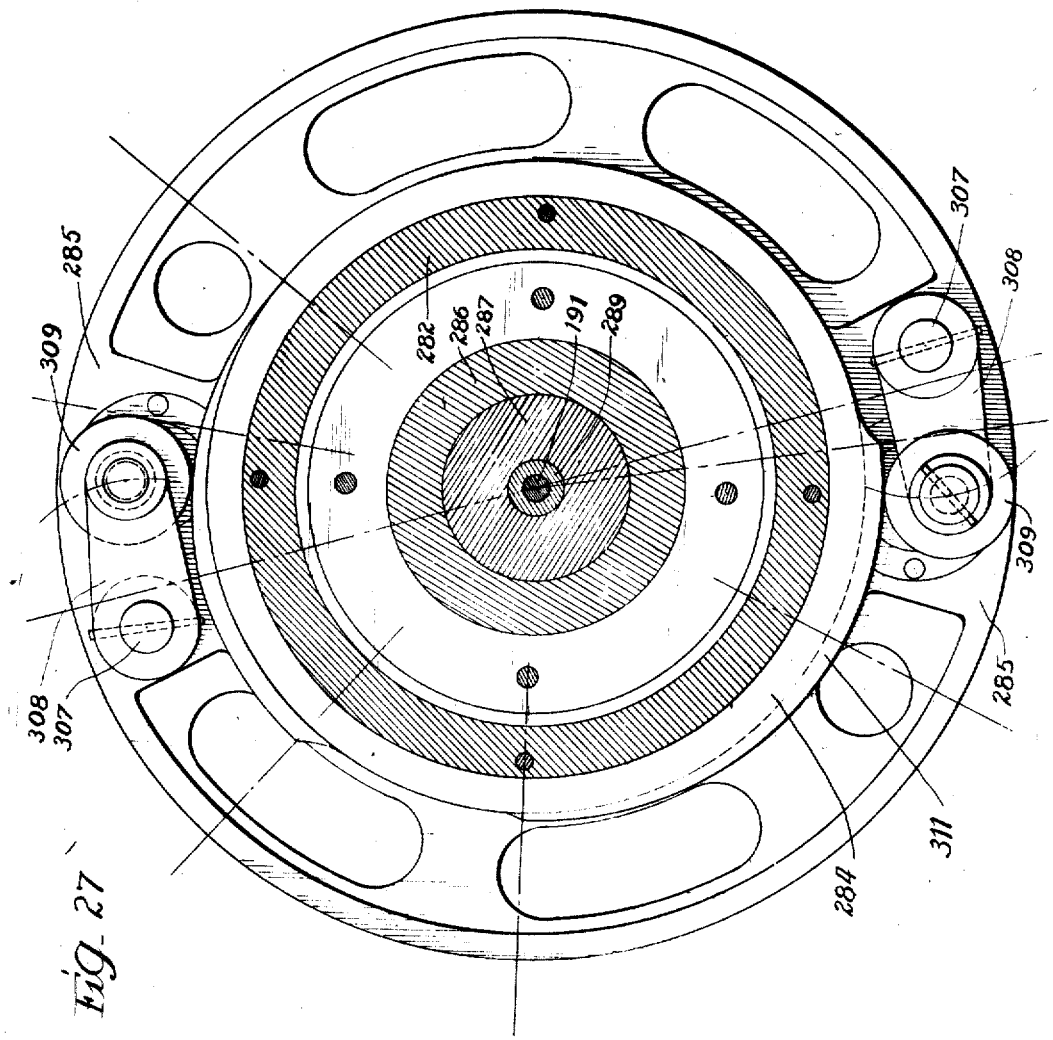

Figs. 7 and 8 are sections taken respectively on the lines 7—7 and 8—8 of Fig. 6;

Fig. 9 is a partial transverse section taken to the right of the turret;

Fig. 10 is a similar section showing the arrangement for rectangular cans;

Fig. 11 is a section taken substantially on the line 11—11 of Fig. 10;

Fig. 12 is a similar section taken substantially on the line 12—12 of Fig. 9;

Fig. 13 is a section taken substantially on the line 13—13 of Fig. 10;

Figs. 14 and 15 are perspective views respectively of the gauge slides for oval and rectangular cans;

Fig. 16 is a section taken substantially on the line 16—16 of Fig. 1;

Fig. 17 is a section taken substantially on the line 17—17 of Fig. 16;

Fig. 18 is an enlarged detail of the can end feeding mechanism;

Fig. 19 is a section taken substantially on the line 19—19 of Fig. 17;

Fig. 20 is a section taken substantially on the line 20—20 of Fig. 16;

Fig. 21 is a section taken substantially on the line 21—21 of Fig. 20;

Fig. 22 is a schematic view showing the relation of certain of the can end cut-out parts;

Fig. 23 is a section taken substantially on the line 23—23 of Fig. 21;

Fig. 24 is a side elevation of the seaming head for oval cans;

Fig. 24ª is a section taken substantially on the line 24ª—24ª of Fig. 24;

Fig. 25 is a view similar to Fig. 24 of the seaming head for rectangular cans;

Fig. 26 is a section taken substantially on the line 26—26 of Fig. 24;

Fig. 27 is a section taken substantially on the line 27—27 of Fig. 26;

Fig. 28 is an isolated perspective view of the roller contour guide for rectangular can ends;

Fig. 29 is a similar view of a like part for oval can ends;

Fig. 30 is a section taken substantially on the line 30—30 of Fig. 31;

Fig. 31 is a perspective view of a seaming roll and mounting;

Figs. 32 and 33 and 34 are fragmentary details showing the action of the seaming rolls in forming the seam; and Fig. 35 is an isolated perspective view of a can end feed cut-out, roll and mounting.

For the purpose of illustrating our invention we have shown on the drawing an apparatus in which it is embodied and parts being disclosed to show the adaption of the apparatus to both oval and rectangular cans. The apparatus shown on the drawing is adapted to form a double seam and is of the two roller type.

Referring first to Figs. 32 to 34 it will be noted that the can body indicated at 41 receives a can end or cover 42 having an offset shoulder 43 and an outstanding peripheral flange 44 provided, if desired, with the usual gasket 45. The upper end of the can body is flanged as indicated at 46, such flange entering within a curl 47 on the outer edge of the flange 44 of the can end. The first operation roll interlocks the end and body into the partially formed seam indicated at 48 and this is flattened against the body as indicated at 49 by the second operation roll, the first operation roll being indicated by reference character 51 and the second operation roll by reference character 52. During this operation a chuck 53 enters within the shoulder of the can end and provides an abutment for the forming of the seam. The can bodies and ends are fed in automatically to a turret and with the axis of the can extending in horizontal position. The feeding of the ends and bodies, their assembly, the operation of safety devices to determine whether or not such ends and bodies are assembled, the seaming operation and the ejectment of the bodies with the applied ends are all automatic in this apparatus, and all that an attendant need do is to see that the proper supply of bodies and ends is present and give the apparatus necessary attention should the ends and bodies fail in proper feeding.

The apparatus comprises a suitable base 61 having an upwardly extending part 62 for the seaming head at one side and an upwardly extending part 63 for the turret and other co-operating parts. A feeding apparatus, to be presently described, is supported from a frame part 64 extending up above the part 62.

The feeding apparatus mentioned comprises devices for feeding both the can bodies and the can ends to an intermittently rotating turret. This turret comprises a pair of disks or carrier members 65 and 66 upon a hub 67 fast on a shaft 68 mounted in a bearing 69 at the upper part of frame member 63. Viewing Fig. 9, for example, it will be noted that these carrier members 65 and 66 are provided with pockets 71 adapted to pass beneath a body chute formed of angle members 72 and containing a stack of bodies 41. This chute is suitably supported from the frame part 64 by a bracket 73, the angle members being held together by cross braces 74. The can bodies move down by gravity through the chute and onto the turret dropping successively into the pockets 71 as these pockets are presented. At the forward side in the direction of travel a confining guide 75 is provided to hold the bodies accurately in the pockets. Fig. 9 shows a feed and turret for oval can bodies and Fig. 10 a feed and turret for rectangular can bodies.

The turret indicated in Fig. 10 by reference character 76 is provided with pockets into which the can bodies may be inserted cornerwise, the wall 77 at the rear of each pocket 78 having a lip to engage beyond the bodies. The feed in this instance is an angular one as indicated at 79 in order that the can bodies may be presented in proper angular relation and is secured upon a bracket 81 fixed on a ledge 82 on the forward side of frame part 64.

The can ends are fed from a chute formed of guide bars 83 of angle formation, the stack of ends being supported upon a separator composed of a plurality of retractable blades 84 and separating knives or rolls 85, the blades and rolls being alternately projected into the path of can end feeding movement by a mechanism to be now described, and in this connection attention is directed to Figs. 16 to 23 inclusive and Fig. 35.

Referring first to Fig. 16, it will be noted that there are three blades 84 mounted upon the end of slides 86 movable in slide ways 87 (Fig. 19) in an annular supporting plate 88. In the supporting plate 88 is an annular slide groove 89 in which may be oscillated arcuately a ring 91, which ring is provided with three inclined slots 92 into which take rolls 93 on the under surfaces of the slides 86. This ring is oscillated by an angle lever 94 pivoted at 95 on a bracket 96 on the support and having a roll 97 taking into a cam slot 98 on a circular cam 99 upon a shaft 101, which shaft, as will be presently described, is given continuous rotation.

Each roll 85 is carried in a swinging lever 102 pivoted at 103 in a slide block 104. This slide block normally moves with the support 84 and is held in place upon a positioning plate 105. The slide block 104 is cut away at the rear at 106 to embrace a boss 107 upon the plate 105 and on the bottom of the block 104 is a downwardly extending shoulder 108 adapted to fit in an aperture 109 on the plate 105. Recess 111 is provided in the rear of the slide block 104 and into this recess a spring 112 bearing against the boss 107 is provided. Springs 110 are positioned in recesses in the heads of the levers 102 and control vertical movement of the rolls 85. In action the rolls 85 are swung arcuately about the pivots 103 to separate the flanges of the stack of can ends, cutting out a lowermost one and permitting it to drop from the stack when the supports 84 are withdrawn. The springs 112 normally hold the slides in forward position and permit them to yield should the rolls be forced against the stack with the can ends slightly elevated and in the path of the movement of the roll edge. The spring in this event holds this roll closely against the edge of the can end and permits it to be projected in between the can edge of the lowermost end and the one next above when the stack has settled sufficiently to permit this. This insures separation even though the original stroke should be ineffectual and is a very important feature. The springs 110 also serve to make certain the release of individual ends despite unfavorable conditions. They normally hold the rolls down to prevent their cutting out more than a single end but permit them to rise in case a malformation of an end flange makes that necessary to produce separation. The swinging of the levers 102 is accomplished by an annulus 113 mounted above the annulus 91, said annulus 113 being oscillated by a roll 114 carried in a bearing 115 and engaging a cam 116 upon the shaft 101. This annulus is provided with three radial slots 117 in which are disposed blocks 119 mounted upon bolts 121 taking down through slots 122 in the tails 123 of the levers 102. The bolts are adjusted in the slots engaging lock plates 124 and 125 upon opposite ends of the tails. The can ends are thus successively cut out from the stack and fall into a directing chute 131 (Fig. 17) down into position in front of the cans 41 as they reach the bottom end of the can body chute. The guiding surfaces, indicated at 132, for the ends as they come into registration with the can bodies are so inclined with respect to each other that the shoulders of the can ends are positioned in the open ends of the bodies. This assembly occurs as the cans reach a turret or pocket carrier movable intermittently about a horizontal axis. This carrier in the present instance consists, as has been stated, of two members 65 and 66 upon the shaft 68. This turret or carrier moves the cans progressively to a seaming station where seaming is accomplished and the can bodies ejected:

Intermittent movement is communicated to the turret as will be now described. Reference character 141 indicates a main power shaft having bearing in the main frame in suitable fashion as at 142 and 143 and carrying at one end a pulley 144 and at the other a wheel 145. Throughout the operation of the apparatus the shaft 141 revolves continuously and is provided with a worm 146 engaging a worm gear 147 upon a cross shaft 148 having bearings in the main frame as at 149 and 151. This shaft through a chain drive 152 engaging a sprocket wheel 153 on shaft 101 actuates the can end feed as already described. A bevel gear 154 is mounted on the shaft 148 and engages a bevel gear 155 of a vertical shaft 156 having bearing in a sleeve 157 in the frame part 63. The shaft 156 also has a bevel gear 158 engaging a bevel gear 159 upon a horizontal shaft 161 near the top of frame part 63 and in parallelism with the shaft 68. The shaft 161 carries at its outer end the actuator 162 of a Geneva movement. The driven portion or star wheel 163 is mounted upon shaft 68, this Geneva movement producing advancing action of the turret or carrier after each seaming operation.

Fig. 9 shows the turret arrangement for oval cans and Fig. 10 for square or rectangular cans. In each instance a guide 75 is fixed to the front frame part about the movement of can travel and holds the cans in the pockets after they have once been received. Two front can guides 172 and 173 are provided upon the forward part 64 of the frame and serve to keep the covers or ends pushed well into the cans as they are advanced by the carrier. The seaming is done when the cans reach the lowermost point of travel of the turret and at this location the cans are pushed into a seaming head, the bodies tightly embraced, trued and held, and the seaming accomplished. The cans are pushed forward by an end chuck or plunger 175 fixed on the end of a reciprocating rod or shaft 176 mounted in bearings 177 in part 63 of the frame and pivotally connected to a yoke 178 extending up from a fulcrum sleeve 179 on a cross pivot 181 in the frame. An arm 182 extends down from the sleeve 179 and carries a roller 183 at its lower end, which roller engages in a cam groove 184 of a cam 185 upon the shaft 148, the timing of the action being such that the chuck 175 pushes the can into the seaming head at the time the turret is at rest. This inward movement of the can causes it to engage a rod 191 extending through the seaming head and connected at its outer end to an arm 192 of a bell crank pivoted at 193 on a bracket 194 extending out from the frame and having a second arm 195 connected by an extensible link 196 to embrace a cross shaft 197, this shaft being continuously driven through bevel gears 198 and 199 from shaft 148, which rod acts to separate the seamed cans from the seaming head after the second operation and this by the action of a cam roll 201 engaging a cam groove 202 in the adjacent face of a cam member 203 fixed on the shaft 197.

At the time the can starts to move forward into the seaming head, truing holding and guiding slides illustrated in detail in Figs. 14 and 15 move in to embrace the can body just back of the body flange and bring it to true accurate formation. These slides comprise a pair of plates 204 having can receiving recesses 205 in their adjacent faces and having guide parts 206 and 207 at the bottoms and tops. Parts 207 engage behind a guide plate mounted on a plate 208 fixed to the forward face of the frame part 64, which plate carries also the guides 172 and 173. The slides are engaged at their bottoms in slide grooves 209 in the frame part 64.

Viewing Figs. 9 and 10 it will be noted that a carrier block 211 is positioned in the frame part 62 and this block carries a vertical slide 212 connected by links 213 with two bell cranks pivoted at 214 and each having an arm 215 engaged in an opening 216 in its companion slide, and an arm 217 pivotally connected at 218 with the link. A link 219 is pivoted to the bottom slide and to an arm 221 of a bell crank pivoted at 223 in the frame and having the other arm 224 engaging a cam 225 on shaft 148. Movement of this cam causes the slides to reciprocate in and out, being in in position, i. e., can embracing position, when the turret is at rest and coming to fully in position at about the time the chuck 175 has moved the can into engagement with the seaming head.

Means are provided to stop the entire machine should any can body be fed in without its companion end. This means comprises a rod 231 having a bearing at 232 in the frame and pivotally connected to an arm 233 upon a shaft 234. This shaft 234 carries at its opposite end an arm 235 pivoted to a vertically movable link 236 connected at its lower end to an arm 237 pivoted at 238 in the frame and having a cam roll 239 moving in a cam slot 241 of cam member 203. A collar 242 is mounted on the rod and a spring 243 is interposed between this collar and a bearing lock 244 on the arm 237 so that the rod is normally pushed upwardly to draw a nut 245 against the arm. As the cam 203 revolves the rod 236 reciprocates vertically and the detector rod, i. e., the rod detecting whether or not a can end is present and numbered 231, is projected periodically across the path of can movement. If the can end be present the inward movement of the detector rod is held through the compression of a spring 243. If, however, no can be present, we have provided means for causing disconnection of the power from the operating parts.

A clutch 251 is provided upon the main power shaft and this clutch is controlled by a clutch arm 252 connected by a link 253 with a bell crank 254 upon a shaft 255. An arm 256 loose on this shaft is provided with a roller 257 engaging a cam 258 on shaft 197. A pawl 259 is pivoted at 261 on the bell crank 254 and in position to engage a notch 262 in the arm 256 if this pawl be lowered into notch engaging position. The pawl, however, is normally held elevated, when a can end is present, by a link 263 connected with an arm 264 movable with the pawl and connected to a lever 265 pivoted at 266 on the frame of the machine and having a loose connection 267 with the rod 236.

Unless the spring or the rod 236 be compressed on the upward movement of the arm 237 under the action of its cam by the pressure of can end resisting the rod 231, the pawl is lowered into position to engage the notch 262 and the next movement of the cam 258 causes the clutch 251 to be disconnected.

Manual means are also provided to disconnect this clutch and these means comprise a rod 271 pivoted at 272 with a bell crank 254 and to an arm 273 on a vertical shaft 274, which shaft is provided with a hand lever 275 extending through the apparatus and out at the front.

Figure 5:
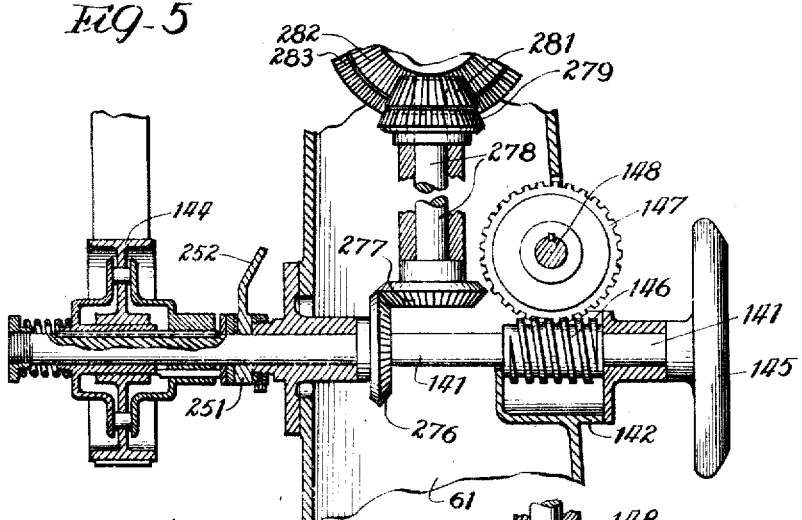
Fig. 5 is a section taken substantially on the line 5—5 of Fig. 1.

The actual seaming is accomplished by seaming rolls mounted on the seaming head and actuated by the power shaft as will now be described. A bevel gear 276 (Fig. 5) upon main power shaft 141 meshes with a bevel gear 277 upon a vertical shaft 278, which vertical shaft has two bevel gears 279 and 281 at its upper end. It will be noted (Fig. 26) that these gears mesh with bevel gears 282 and 283,—one (282) carried in a roll operating annulus 284 upon a seaming head 285, which seaming head carries the other gear 283.

The seaming head is provided with a hub 286 embracing a shaft or mandrel 287 which is fixed by a key 288 against rotation, this shaft being hollow to receive a sleeve 289 carrying at its forward end the combined chuck and cam plate to be presently more fully described.

The rod 191 at its end is provided with a spring pressed terminal 292. The can when thrust into the seaming head engages a fixed chuck 53 held at the center of the chuck plate. Thus positioned it is held stationary while the seaming is accomplished. Viewing Fig. 25 it will be noted that two seaming rolls, indicated by reference characters 294 and 295, are provided, these rolls constituting first and second operation rolls and successively operating upon the cans to curl the flanges in the manner already described. Each roll is carried in a roll arm 296 and 297 pivoted at 298 upon control arms 299 in turn pivoted at 301 in the revolving seaming head 285. Each arm 299 is provided with a roll 302 following in a groove 303 about the chuck 291, which roll serves to guide the seaming roll in its movement about the non-circular can end in seaming relation. Slight movement of the rolls into and out of engagement with the can is produced by swinging the arms 296 and 297 with respect to the carrier arms 299. Each arm 296—297 is provided with a pawl 304 carrying a set screw 305 in engagement with a control arm 306 pivoted at 307 through the head. Engagement between each arm 306 and set screw 305 is substantially over the axis of the pivot of the arm 299. The pivot shaft 307 is provided behind the seaming head with a fixed arm 308 carrying a roll 309 engaging a cam 311 on the annulus 284, which annulus, as has been stated, carries the gear 282. The gear connection is such that the annulus rotates almost but not quite with the seaming head. In other words the seaming head makes one more rotation for each seaming operation than that made by the annulus.

Figs. 24 and 25 show respectively the substitution of cam guides for the rolls 302 for elliptical and rectangular cans. In accordance with this actuation of the seaming rolls the first operation roll travels about the can a number of times performing the operation then rides off the cam guides and becomes idle while the second operation roll comes into action. After the seaming operation is complete the movable chuck is retracted and the rod 191 pushes the seamed can back into position to be carried around for discharge by the carrier. This discharging is effected by stop guide 312 located so as to project across the pockets and the cans are delivered out between it and a delivery chute or table 313.

It is thought that the invention and many of its attendant advantages will be understood from the foregoing description, and it will be apparent that various changes may be made in the form, construction and arrangement of the parts without departing from the spirit and scope of the invention or sacrificing its material advantages, the form hereinbefore described being merely a preferred embodiment thereof.

We claim:

1. In a machine for seaming flanged can ends to flanged can bodies, the combination of a seaming head, a carrier rotating about a horizontal axis, means feeding non-circular can ends edgewise and downward and non-circular can bodies into said carrier, and means projecting said bodies endwise and thereby the can end into said seaming head for seaming.

2. In a machine for seaming flanged can ends to flanged can bodies, the combination of a seaming head, a carrier rotatable about a horizontal axis and adapted to contain the carried can ends and bodies to be seamed, means feeding the can bodies and can ends edgewise and downward into said carrier, the ends being propelled by the bodies in the movement of the carrier, and means projecting said bodies and thereby the can ends endwise into said seaming head for seaming.

3. In a machine for seaming flanged can ends to flanged can bodies, the combination of a carrier for said can ends and said can bodies and rotatable about a horizontal axis, a seaming head, means arranging said can bodies and can ends in operating relation in said seaming head for seaming, and a pair of slides embracing each can body rearwardly of its flange for truing the same as an incident prior to the seaming action.

4. In a machine for seaming flanged can ends to flanged can bodies, the combination of a turret receiving the can bodies and moving them to a seaming station, a pair of horizontal reciprocating slides for embracing each body as it arrives at the seaming station and truing the same, and cam actuated bell cranks for moving said slides conjointly to embrace said bodies.

5. In a machine for seaming flanged can ends to flanged can bodies, the combination of a turret rotatable about a horizontal axis and having pockets for receiving the can bodies, means moving the can bodies endwise and thereby the can ends and inserting the can ends in the bodies carried in said turret at an early station in the operation of the turret, and means holding said ends in said bodies during movement of the turret to the seaming station.

6. In a machine for seaming flanged can ends to flanged can bodies, the combination of a frame, a stack holder for holding accumulated can bodies and a stack holder for holding accumulated can ends, both said stack holders being mounted on said frame and in spaced relation, a turret receiving can ends and can bodies from said stack holders, means for actuating the turret with an intermittent movement, and a guide producing relative approach of the ends and bodies as they are fed into position in said turret, and a reciprocating plunger for forcing the can body endwise in said turret.

7. In a machine for seaming flanged can ends to flanged can bodies, the combination of a frame, a stack holder for holding accumulated can bodies, and a stack holder for holding accumulated can ends, both said stack holders being mounted on said frame and in spaced relation, a turret receiving can ends and can bodies from said stack holders, a plunger and guide producing gradual approach of the body towards its end as they are fed into position in said turret, and seaming mechanism into proper relation with which the can bodies and ends are so moved endwise.

8. In a machine for seaming flanged can ends to flanged can bodies, the combination of a seaming head, a carrier rotating about a horizontal axis, means for feeding can bodies into said carrier, means for separating can ends from a stack and feeding them into position to be seamed onto the bodies, said means being repetitive and spring-controlled to insure separation of single ends even under unfavorable conditions, and means for positively projecting said ends and bodies endwise into said seaming head for seaming.

9. In a machine for seaming flanged can ends to flanged can bodies, the combination of a turret rotatable about a horizontal axis and adapted to convey can bodies and can ends positioned therein from a receiving to a seaming station, means for forcing can bodies and can ends endwise in said turret, power mechanism for driving said machine, a clutch in said power mechanism, and means disconnecting said clutch when a can is arranged at a predetermined point without an end accompanying it.

10. In a machine for seaming flanged can ends to flanged can bodies, the combination of a turret rotatable about a horizontal axis and adapted to convey can bodies and can ends positioned therein from a receiving to a seaming station, power mechanism for driving said machine, a clutch in said power mechanism, and means disconnecting said clutch when a can is arranged at a predetermined point without an end accompanying it, said means comprising a cam oscillated arm, and a clutch control comprising a pawl normally held above said arm and adapted to be arranged in engagement therewith when said end is absent.

11. In a machine for seaming flanged can ends to flanged can bodies, the combination of a seaming head, can carrying means adapted to arrange can ends and can bodies in assembled relation adjacent the seaming head, devices engaging the ends of the can bodies for forcing and moving the can bodies endwise in said carrying means, and means insertable into the can in the absence of a head and for preventing action of the seaming heads in the absence of a can end.

MAGNUS E. WIDELL.
ARTHUR A. JAHR.